United States Patent [19]

Dal Palu e,acu uAttilio

[11] Patent Number: 5,439,035
[45] Date of Patent: Aug. 8, 1995

[54] TEMPERATURE AND/OR PRESSURE RESISTANT HOSE

[75] Inventor: Dal Palu e,acu uAttilio, Rivoli, Italy

[73] Assignee: Fabbrica Italiana Serrature Torino, S.p.A., Italy

[21] Appl. No.: 246,848

[22] Filed: May 20, 1994

[30] Foreign Application Priority Data

May 21, 1993 [IT]  Italy .............................. TO93U0113

[51] Int. Cl.$^6$ .............................................. F16L 9/06
[52] U.S. Cl. .................................. 138/121; 138/173; 138/177
[58] Field of Search ............... 138/121, 122, 173, 177, 138/178

[56] References Cited

U.S. PATENT DOCUMENTS

| | | | |
|---|---|---|---|
| 3,578,777 | 5/1971 | DeGain | 138/121 |
| 3,605,817 | 9/1971 | Bauman et al. | 138/121 |
| 3,802,202 | 4/1974 | Maroschak | 138/121 |
| 4,592,231 | 6/1986 | Kant | 138/121 |
| 4,877,224 | 10/1989 | Watts | 138/121 |
| 4,950,103 | 8/1990 | Justice | 138/177 |

FOREIGN PATENT DOCUMENTS

| | | | |
|---|---|---|---|
| 1209569 | 10/1970 | United Kingdom | F16L 9/00 |
| 1380633 | 1/1975 | United Kingdom | F16L 11/08 |

Primary Examiner—David A. Scherbel
Assistant Examiner—Patrick F. Brinson
Attorney, Agent, or Firm—Webb Ziesenheim Bruening Logsdon Orkin & Hanson

[57] ABSTRACT

A hose including a number of circumferential corrugations substantially parallel to one another when the hose is unbent, separated by grooves, and connected in a longitudinal direction by ribs, so that each corrugation is connected to at least one adjacent corrugation. The ribs form at least two groups of angularly-offset ribs, and the ribs in the first group alternate with the ribs in the second group.

7 Claims, 1 Drawing Sheet

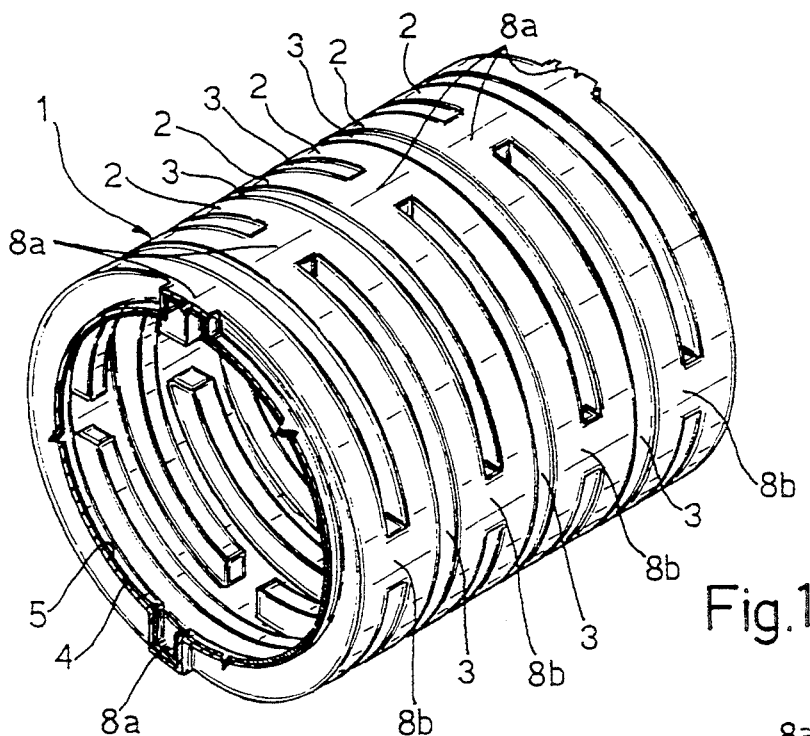
Fig.1
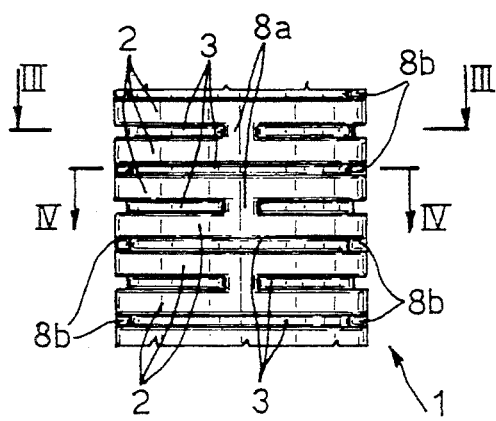
Fig.2
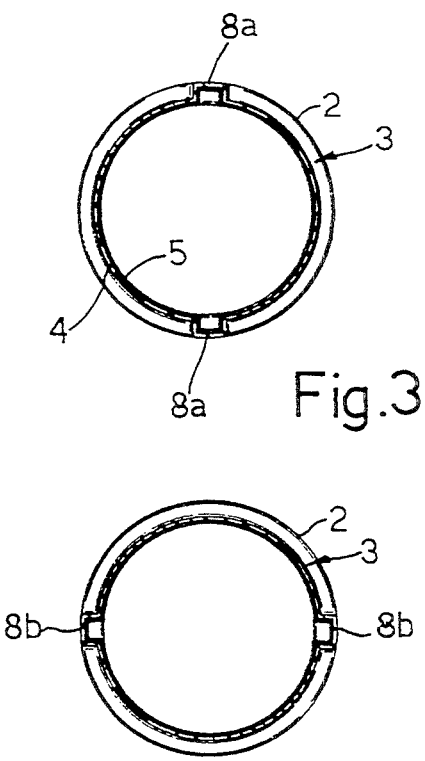
Fig.3
Fig.4

TEMPERATURE AND/OR PRESSURE RESISTANT HOSE

BACKGROUND OF THE INVENTION

1. Field of the Invention

The present invention relates to a temperature and/or pressure resistant hose, in particular, a hose for vehicle engine cooling liquid circuits.

2. Background Information

Italian Utility Patent n. 219.178, filed on 20 Dec. 1989, relates to a flexible two-wall conduit comprising smooth rigid portions, and flexible corrugated portions for adapting it to the required assembly configuration, and which is lightweight, cheap to produce, and compact to store and transport. Moreover, the double wall, formed of two layers of different materials, provides for good resistance to external agents, temperature, and the liquid inside the conduit.

The above known conduit, however, is susceptible to improvement as regards stretch resistance under high temperature and/or pressure conditions. In fact, when subjected to high temperature and/or pressure, the hose, featuring bellows portions, stretches and may even yield permanently, which is not only undesirable but also forbidden by current standards in some countries, when the amount of stretch exceeds a predetermined percentage.

SUMMARY OF THE INVENTION

It is an object of the present invention to provide a hose designed to overcome the aforementioned drawback.

According to the present invention, there is provided a temperature and/or pressure resistant hose comprising a number of circumferential corrugations substantially parallel to one another when the hose is unbent, and separated from one another by grooves; characterized in that it comprises at least a first and a second number of ribs, each connecting, in the longitudinal direction of the hose, at least two adjacent corrugations, so that each corrugation is connected to at least one successive corrugation; said ribs in said first number being angularly offset in relation to said ribs in said second number; and said ribs in said first and second numbers alternating in said longitudinal direction.

BRIEF DESCRIPTION OF THE DRAWINGS

A preferred, non-limiting embodiment of the present invention will be described by way of example with reference to the accompanying drawings, in which:

FIG. 1 shows a view in perspective of a portion of hose in accordance with the present invention;

FIG. 2 shows a top plan view of the FIG. 1 portion;

FIGS. 3 and 4 show cross sections along lines III—III and IV—IV respectively in FIG. 2.

DETAILED DESCRIPTION OF THE INVENTION

Number 1 in FIG. 1 indicates a hose in accordance with the present invention. At least the portion shown of hose 1 presents a bellows design defined by a number of corrugations 2 parallel to one another (when the hose is unbent) and perpendicular to the longitudinal direction of hose 1. Corrugations 2 are separated by grooves 3 also parallel to one another and to corrugations 2, and extending about a smaller diameter as compared with corrugations 2. In the example shown, the hose is also a two-wall type, and comprises an outer wall 4, e.g. of nylon or other material with good mechanical characteristics; and an inner wall 5, e.g. of polythene, polyethylene or other material with a good resistance to temperature and the engine cooling liquid.

As shown, corrugations 2 are connected by pairs of transverse ribs 8a, 8b extending perpendicular to corrugations 2, and connecting each corrugation 2 to the two adjacent corrugations. In practice, ribs 8a, 8b interrupt the continuity of grooves 3, each of which, in the example shown, is therefore defined by two half circumferences.

As shown particularly in FIGS. 3 and 4, each pair of ribs 8a comprises two diametrically-opposed ribs extending inside the same groove 3; and all of ribs 8a extend substantially in a first plane vertical in relation to FIGS. 3 and 4. Similarly, each pair of ribs 8b comprises two diametrically-opposed ribs extending inside the same groove 3; and all of ribs 8b extend along a second plane perpendicular to the first plane and horizontal in relation to FIGS. 3 and 4. Also, the pairs of ribs 8a, 8b alternate, in the sense that each groove 3 between two adjacent corrugations 2 and housing a pair of ribs 8a is followed by a groove 3 housing a pair of ribs 8b, so that adjacent corrugations 2 are connected alternately by ribs 8a or ribs 8b.

Ribs 8a, 8b extend about the same diameter as, and are therefore continuous with, corrugations 2.

The hose according to the present invention is conveniently formed by continuous drawing, with two coaxial extrusion heads for the two walls, and then blow molded to form corrugations 2 and ribs 8a, 8b.

As each corrugation 2 is connected longitudinally to the two adjacent corrugations, this therefore provides for preventing stretching of the hose in the presence of high temperature or pressure, while at the same time maintaining the flexibility of the hose in all directions, even though slightly reduced as compared with a corrugated hose with no ribs. Flexing in each direction, in fact, is still assured by relative rotation of the corrugations in pairs (instead of singly, as with the known hose).

Clearly, changes may be made to the hose as described and illustrated herein without, however, departing from the scope of the present invention. In particular, the rib sequence pattern described and illustrated herein, purely by way of a preferred solution, may be replaced by other configurations, e.g. pairs of ribs connecting three adjacent corrugations and alternating with pairs of ribs, offset angularly in relation to the first, connecting other sets of three corrugations, wherein the last corrugation in each set of three represents the first corrugation in the next set.

Moreover, as with the known hose described in the aforementioned utility patent, flexible corrugated portions may alternate with rigid portions of the same hose.

Finally, the example described of a two-wall hose is purely indicative, and the same concept also applies to hoses having the mechanical and chemical characteristics required for specific applications.

I claim:

1. A temperature and pressure resistant hose comprising:

a plurality of circumferential corrugations substantially parallel to one another when said hose is unbent, and said corrugations being separated from one another;

a plurality of grooves with at least one of said grooves separating each adjacent pair of said corrugations; and a plurality of ribs, each said rib connecting, in a longitudinal direction of said hose, an adjacent pair of said corrugations, wherein each said corrugation is connected to a successive said corrugation by at least one said rib positioned in a first plane and said successive corrugation being connected to a next successive said corrugation by at least one said rib positioned in a second plane;

wherein said ribs in said first plane are angularly offset in relation to said ribs in said second plane; and wherein said ribs in said first plane and said ribs in said second plane are alternating in said longitudinal direction of said hose between said adjacent pairs of said corrugation, whereby said ribs between one said adjacent pair of said corrugations are angularly offset from said ribs between a next adjacent pair of said corrugations.

2. A hose as claimed in claim 1, wherein two ribs are provided between each said pair of adjacent corrugations, said two ribs provided on diametrically opposed sides of said hose.

3. A hose as claimed in claim 2, wherein said second plane is perpendicular to said first plane.

4. A hose as claimed in claim 1, wherein said ribs extend about a same diameter of said hose as said corrugations.

5. A hose as claimed in claim 1, wherein said ribs are hollow.

6. A hose as claimed in claim 1, wherein said hose comprises at least two walls.

7. A hose as claimed in claim 1, wherein said hose comprises corrugated portions and smooth rigid portions.

* * * * *

UNITED STATES PATENT AND TRADEMARK OFFICE
CERTIFICATE OF CORRECTION

PATENT NO. : 5,439,035
DATED : August 8, 1995
INVENTOR(S) : Attilio Dal Palù

It is certified that error appears in the above-indentified patent and that said Letters Patent is hereby corrected as shown below:

On the title page: Item [19], delete "e,acu uAttili".

Title page, item '[75] Inventor:', "Dal Palu e,acu uAttilio" should read --Attilio Dal Palù--.

Signed and Sealed this

Twenty-first Day of November, 1995

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO.   : 5,439,035
DATED        : August 8, 1995
INVENTOR(S)  : Attilio Dal Palù

It is certified that error appears in the above-indentified patent and that said Letters Patent is hereby corrected as shown below:

Title page, item '[19]', delete "e,acu uAttilio".

Title page, item '[75] Inventor:', "Dal Palu e,acu uAttilio" should read --Attilio Dal Palù--.

This certificate supersedes Certificate of Correction issued November 21, 1995.

Signed and Sealed this

Second Day of April, 1996

Attest:

BRUCE LEHMAN

Attesting Officer　　　Commissioner of Patents and Trademarks